June 2, 1970 R. K. SCHWITZGEBEL 3,515,472
VEHICLE CAMERA SYSTEMS

Filed Nov. 14, 1967 3 Sheets-Sheet 2

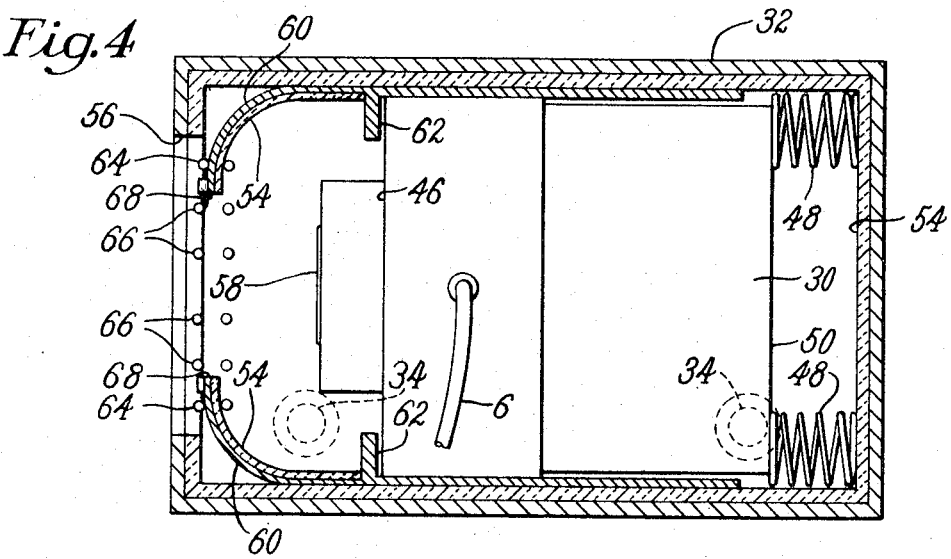
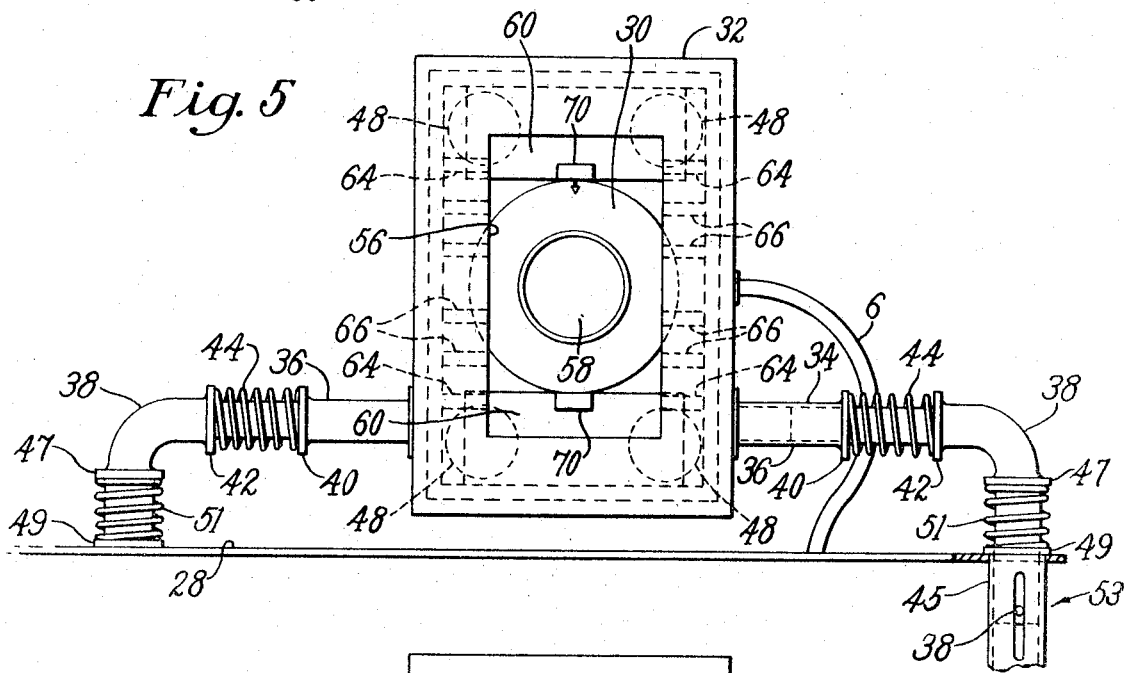
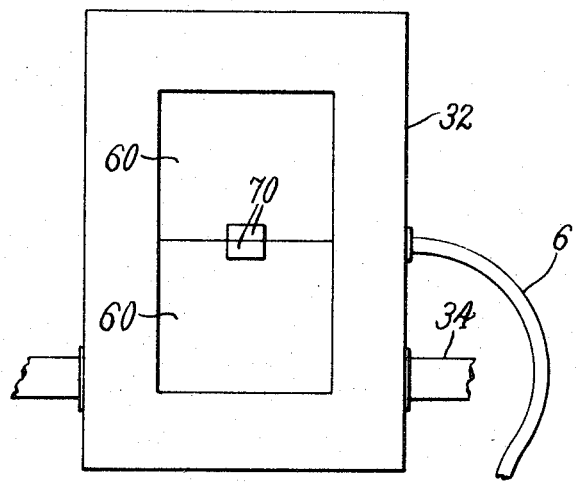

United States Patent Office 3,515,472
Patented June 2, 1970

3,515,472
VEHICLE CAMERA SYSTEMS
Ralph K. Schwitzgebel, Belmont, Mass.
(5 Pelham Road, Waltham, Mass. 02154)
Filed Nov. 14, 1967, Ser. No. 682,954
Int. Cl. G03b 19/00, 29/00
U.S. Cl. 352—132                8 Claims

ABSTRACT OF THE DISCLOSURE

A vehicle camera system comprising means for mounting a motion picture camera on a vehicle, which mounting means operates to protect the camera against shock, fire and missile hazards, and camera control means for causing operation of the camera either manually or automatically by means responsive to vehicle control means, the camera control means being operative to continue camera operation after release of the camera control means or vehicle control means.

BACKGROUND OF THE INVENTION

Field of the invention

This invention relates generally to motion picture camera systems and is directed more particularly to a vehicle camera system including camera mounting means and camera control means.

Description of the prior art

It has been found advantageous in research and study regarding automobile accidents to record reactions of drivers under predetermined circumstances by means of motion picture cameras mounted in test vehicles. It has therefore been the practice to mount cameras on test vehicles in such a manner as to record on film the actions of the driver of the vehicle, the movements of nearby automobiles, and instrument panel data from the test vehicle.

One problem which has arisen in such test programs has been the lack of means for automtaically starting and stopping the camera in such a manner as to have the camera in operation throughout a period of crises and for a brief period beyond.

Another problem experienced in such tests is that of providing protection for the camera upon and after impact in crash situations. A relatively high level of camera and film loss has been experienced in such programs, causing undue expense not only to photographic equipment, but severe loss through lack of recordation of crash experiments.

Thus, while systems of this character have been suggested and utilized, they have been characterized by shortcomings which are overcome by the instant invention.

SUMMARY OF THE INVENTION

Accordingly, it is an object of the present invention to provide a vehicle camera system suitable for recording crisis situations while the vehicle is in operation.

It is a further object of the invention to provide such a system having automatic, as well as manual, means for controlling camera operation.

It is a still further object of the invention to provide such a system having a camera shut-off means incorporating a delay period for filming beyond the time during which the operator exercises control.

Another object of the invention is to provide such a system in which the camera mounting means protects the camera from the shock of impact.

Yet another object of the invention is to provide such a system in which the camera mounting means includes means responsive to impact of the vehicle to seal the camera so as to protect it from missile hazards and fire.

With the above and other objects in view, as will hereinafter appear, the present invention in one aspect thereof contemplates the provision in a system of the type above referred to of camera control means operable manually by the vehicle operator and/or operable responsive to manipulation of the brake pedal of the vehicle to cause operation of the camera.

In accordance with a further feature of the invention there is incorporated into the system switch means associated with the camera control means, which switch means operates to delay termination of camera operation until a time after release of the camera control means.

In accordance with still another feature of the invention there is incorporated into the system shock absorbing camera mounting means and means responsive to vehicle impact to enclose the camera so as to protect it against crash damage and fire.

The above and other features of the invention, including various novel details of construction and combinations of parts, will now be more particularly described with reference to the accompanying drawings and pointed out in the claims. It will be understood that the particular system embodying the invention is shown by way of illustration only and not as a limitation of the invention. The principles and features of this invention may be employed in various and numerous embodiments without departing from the scope of the invention.

Reference is made to the accompanying drawings in which there is shown an illustrative embodiment of the invention from which its novel features and advantages will be apparent.

BRIEF DESCRIPTION OF THE DRAWINGS

FIG. 4 is an elevational view, partly in section of another portion of the system; and FIGS. 5 and 6 are front elevational views of the portion of the system shown in FIG. 4.

DESCRIPTION OF THE PREFERRED EMBODIMENT

Figure 1:
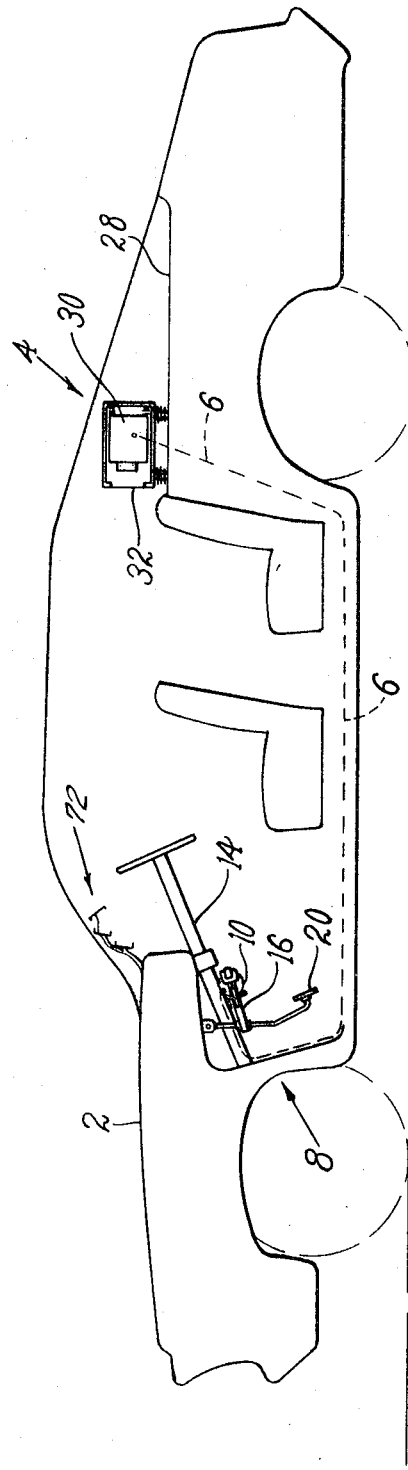
FIG. 1 is an elevational view, partly diagrammatic, of one form of vehicle camera system illustrative of an embodiment of the invention.

Referring to FIG. 1, it may be seen that the illustrative system is mounted in a vehicle 2 and comprises a camera assembly 4 connected by a cable or tube 6 to a camera control assembly 8.

Figure 2:
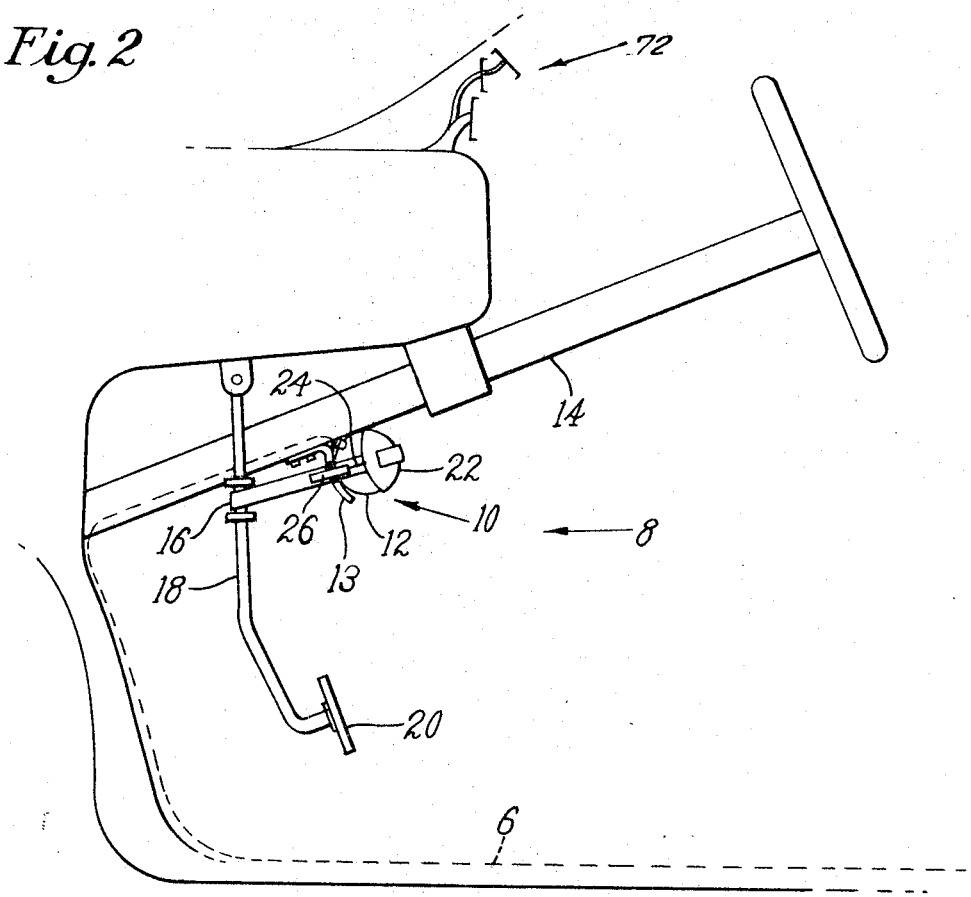
FIG. 2 is an enlarged elevational view of a portion of the illustrative system embodying the features of the present invention.

Referring to FIGS. 1 and 2, it may be seen that the camera control assembly 8 may comprise a pneumatic switch 10 which in the illustrative embodiment is shown as a pneumatic bulb 12 fixed to a bracket 13 connected to a steering column sleeve 14. A compression band 16 interconnects the bulb 12 and a pivotally mounted brake lever 18 supporting a brake pedal 20. Thus, depression of the brake pedal 20 by the vehicle operator causes movement of the band 16 which compresses the bulb 12.

Figure 3:
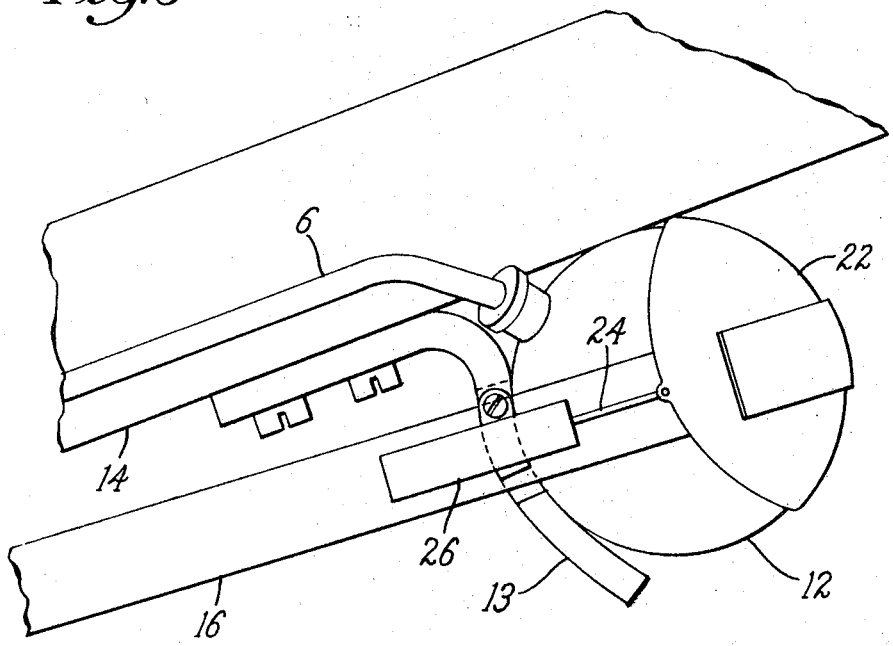
FIG. 3 is a detailed elevational view of a portion of the system shown in FIGS. 1 and 2.

As may be seen in FIG. 3, the band 16 is connected to a hemispherical cap 22, which may be of metal or plastic, and which is of a configuration complemental to the shape of the bulb 12. Connected to the cap 22, or made an integral part thereof, are a pair of rods 24 one of which is shown in FIG. 3, each rod having one end disposed in a delayed release pneumatic switch 26 which is fixed to the bracket 13. When the brake pedal 20 is released and the band 16 ceases exerting compressive pressure on the bulb 12, the delayed release switches 26, by delaying release of the rods 24, maintain pressure on the bulb 12. After a predetermined period of time, usually on the order of a few seconds, the switches 26 release the rods 24 and thereby permit the cap 22 to release its compressive influence on the bulb 12. When the bulb 12 is permitted to expand, a pneumatic signal is transmitted through the tube 6 to the camera assembly 4 to cause cessation of camera operation.

The camera assembly 4 is mounted on the rear deck 28 of the vehicle and comprises a motion picture camera 30 disposed in a protective mounting box 32 (FIGS. 1, 4–6). As used herein, "motion picture camera" is intended to refer to not only the usual photographic film camera, but also the video tape camera and other like devices, equivalent in essence. The box 32 is mounted on expandable rods 34 which comprise telescoping members 36, 38, the members 36 being connected directly to the box 32 and the members 38 being mounted on the deck 28 of the vehicle and being received in the members 36, respectively. The members 36, 38 are provided with opposed flange portions, 40, 42 respectively having coil springs 44 mounted therebetween, as shown in FIG. 5. Thus, if the vehicle is subject to impact from the side the springs 44 will operate to absorb the shock without damage to the camera 30. The members 38 are received in members 45 which are rigidly fixed to the deck 28. The members 38 and 45 are provided with opposed flanges 47, 49 respectively. Coil springs 51 are disposed between the flanges 47, 49 in order to dampen vertical shock forces. A pin-in-slot arrangement 53 (FIG. 5) may be used to limit vertical motion.

Within the box 32 there are disposed, between the back 50 of the camera 30 (FIG. 4) and the rear wall of the box 32, coil springs 48. The springs 48 are attached at one end to the back of the camera and at the other end to the rear wall of the box 32. The springs 48 absorb shock caused by impact from the front or back of the vehicle, the springs permitting the camera to move about within the box in a forward or rearward direction without damage to the camera.

The camera assembly is provided with unique means for protecting the camera against fire and missile hazards upon and after impact from the front. The box 32 is provided with a layer of insulating material 54 (FIG. 4) to facilitate protection from fire. However, the protective box 32 is provided with an opening 56 which permits light to enter a lens 58 mounted on the camera. To insure protection of the camera it is necessary that the opening be sealed upon impact.

To insure that the opening 56 is closed upon impact the camera box 30 is provided with flexible sheet metal members 60 mounted on the interior of the box 30 between the sides of the camera and internal side walls of the box. The flexible metal members 60 are preferably provided with a layer of insulating material 54 in the forward portion of the members, as shown in FIG. 4. Each flexible member 60 is provided with an inwardly-extending flange portion 62 which is located in a position adjacent to, or forward of, the face 46 of the camera 30. The forward portions of the members 60 are disposed at the edges thereof between sets of rollers 64 which act as guides for the members 60 when they are moved toward one another, as will be explained below. At least one other set of rollers 66 is mounted in the box 32 to receive the forward edges 68 of the flexible members 60 and further guide the movement of the flexible members toward each other. The members 60 are provided with catch members 70 which, upon engagement with each other, interconnect in a locking manner to hold the two flexible members together.

Forward movement of the camera 30 within the box 32 causes the forward face 46 of the camera to engage the flange portions 62 of the flexible members 60 and thereby carry forward the members 60. Forward movement of the members 60 causes them to approach one another, being guided by the rollers 64, 66 until the catch members 70 engage and lock the members 60 together, thereby completely closing the box 32 whereby to afford protection to the camera 30 against fire or other crash damage.

To complete the system a series of mirrors 72 are mounted (FIG. 1) on the vehicle and disposed in such a manner as to present to the camera that which is desired to be recorded. For example, the mirrors may be disposed so as to provide a view of conditions to the side or rear of the vehicle, the test vehicle instrument panel, or a portion thereof, and the driver. In addiiton, it is usually desirable to have the road in front of the vehicle photographed. The mounting of the mirrors for particular information is known in the art and will not be discussed in detail herein.

In operation, the camera is loaded with film and the system is ready for operation. After commencement of a test, the camera may be started manually by the operator by squeezing of the bulb 12. As long as the bulb 12 is compressed the camera will continue operation. If the bulb is pressed forward as by pressure applied to the cap 22, the delay switch 26 will permit continued operation of the camera for a few seconds without further attention of the driver.

When the driver of the test vehicle depresses the brake pedal 20, the brake lever 18 is pivoted so as to apply pressure, through movement of the band 16, to the bulb 12, pulling the cap 22 forward and forcing the rod 24 into the delay switch 26. Compression of the bulb 12 sends a signal through the tube 6 to the camera 30 which commences operation. The camera continues to operate throughout the braking period. If the driver "pumps" the brake pedal the camera continuues to operate because the delay switch 26 does not permit the immediate release of the bulb 12. If, under crash conditions, the driver leaves the car prior to impact, the camera will continue to operate. If impact occurs and the driver releases the brake pedal the camera continues operation for a short period, the post-impact recording period being limited, however, by the camera box closure feature. Should impact not take place, however, the recording period is limited to the preset period of time dictated by the time delay switch 26. Thus, recording ceases either by closure of the camera box 32, in the case of impact, or by operation of the delay switch 26 in the situation where no impact occurs.

Assuming impact to occur, as by the test vehicle colliding with a stationary object, the camera 30 moves forward in the box under inertial forces, the movement being cushioned by the coil springs 48. As the camera moves forward it engages the flange portions 62 of the flexible members 60 and forces the members 60 to move forwardly. As the members 60 move forward, the rollers 64, 66 guide the leading edges 68 of the members 60 toward one another until the catch members 70 engage each other to enclose the camera completely.

Under severe crash conditions, when no driver is utilized, an automatic braking device will start the camera in much the same manner as described above. So long as the brake pedal is depressed, whether automatically or by a driver, the system will operate as described above.

The pneumatic switch 10 need not necessarily be a bulb of the type shown, but may instead be a "push-button" type switch, pneumatic or electrical, having built-in delay release means. The precise arrangement of switches is not critical in the camera control means, it being necessary only that the camera control means be actuatable by hand and/or brake operation and include a delay release means.

The band 16 is preferably adjustable so that the slightest braking movement may be made to cause operation of the camera or so that only substantial depression of the brake pedal may be made to actuate the camera. If the band is loosened, a more severe braking movement is required of the brake lever to compress the pneumatic bulb.

Having thus described my invention, what I claim as new and desire to secure by Letters Patent of the United States is:

1. A vehicle camera system comprising means for mounting a motion picture camera or the like on a vehicle, control means operative to start and stop the continuous operation of said camera, said control means including camera stop delay means for delaying stopping of the camera for a predetermined time after operation of said control means to stop said camera.

2. The invention according to claim 1 in which said control means comprises switch means operatively responsive to movement of a vehicle brake pedal, said pedal being mounted on said vehicle and connected to said switch.

3. A vehicle camera system comprising means for mounting a motion picture camera on a vehicle, control means operative to start and stop the operation of said camera, said mounting means comprising a box for retaining said camera therein, said box having an opening for admitting light to the lens of said camera, and means for automatically closing said opening upon impact of said vehicle forwardly.

4. The invention according to claim 3 in which said closing means is operated by movement of said camera in said box.

5. The invention according to claim 4 in which said closing means comprises at least one flexible member engageable by said camera, when said camera is caused to move in said box by said impact, and movable by said camera to a position in which said member covers said opening.

6. The invention according to claim 5 in which said box and said member are of metal and are provided with at least one layer of heat insulating material.

7. The invention according to claim 5 in which said flexible member has a flange portion engageable by said camera to cause said member to move with said camera.

8. The invention according to claim 5 in which said member is provided with catch means for locking said member in said opening covering position.

References Cited

UNITED STATES PATENTS

| 1,589,436 | 6/1926 | Seebold | 95—11 |
| 2,076,482 | 4/1937 | Riszdorfer | 95—11 |
| 2,336,076 | 12/1943 | Durham et al. | |
| 2,428,273 | 9/1947 | Finnegan et al. | 352—93 |
| 3,097,263 | 7/1963 | Lintern. | |
| 3,289,557 | 12/1966 | Garcia et al. | 95—11 |

JULIA E. COINER, Primary Examiner

U.S. Cl. X.R.

95—11; 346—107; 352—242